(12) United States Patent
Shibayama

(10) Patent No.: US 10,214,057 B2
(45) Date of Patent: Feb. 26, 2019

(54) PNEUMATIC TIRE WITH CHAMFERED LATERAL SHOULDER GROOVE

(71) Applicant: TOYO TIRE & RUBBER CO., LTD., Osaka-shi, Osaka (JP)

(72) Inventor: Kensuke Shibayama, Osaka (JP)

(73) Assignee: TOYO TIRE CORPORATION, Itami-shi (JP)

( * ) Notice: Subject to any disclaimer, the term of this patent is extended or adjusted under 35 U.S.C. 154(b) by 98 days.

(21) Appl. No.: 14/878,382

(22) Filed: Oct. 8, 2015

(65) Prior Publication Data
US 2016/0101655 A1 Apr. 14, 2016

(30) Foreign Application Priority Data
Oct. 9, 2014 (JP) .................................. 2014-208164

(51) Int. Cl.
*B60C 11/13* (2006.01)
*B60C 11/03* (2006.01)

(52) U.S. Cl.
CPC ...... *B60C 11/1392* (2013.01); *B60C 11/1323* (2013.01); *B60C 11/0304* (2013.01); *B60C 2011/0369* (2013.01); *B60C 2011/0395* (2013.01)

(58) Field of Classification Search
CPC . B60C 11/00; B60C 11/1384; B60C 11/1392; B60C 2011/0358;
(Continued)

(56) References Cited

U.S. PATENT DOCUMENTS

2007/0215258 A1* 9/2007 Fukunaga ........... B60C 11/0302
152/209.18
2010/0200134 A1* 8/2010 Murata ............... B60C 11/0306
152/209.9
(Continued)

FOREIGN PATENT DOCUMENTS

JP  03186405 A  *  8/1991  ......... B60C 11/1384
JP  2007-112218 A   5/2007
(Continued)

OTHER PUBLICATIONS

Shimizu, Michio (JP 03186405, Aug. 14, 1991, machine translation).*
(Continued)

*Primary Examiner* — Robert C Dye
*Assistant Examiner* — Sedef E Paquette
(74) *Attorney, Agent, or Firm* — Westerman, Hattori, Daniels & Adrian, LLP

(57) ABSTRACT

A pneumatic tire is provided with a tread having a shoulder portion isolated by a main groove, and a slit formed on the shoulder portion, wherein a first tapered portion is formed on a side wall of the slit which comes into contact with the ground first when the tire is rotating, and a second tapered portion is formed on the side wall of the slit which comes into contact with the ground later, an end of the first tapered portion on the main groove side is located at a position closer to the main groove than the end of the second tapered portion on the main groove side, and the second tapered portion is formed so that a width on an opening end of the slit opening at a contact surface is wider than the width of the portion where the second tapered portion is not formed.

6 Claims, 3 Drawing Sheets

(58) Field of Classification Search
CPC ..... B60C 2011/0374; B60C 2011/1392; B60C 2011/1323; B60C 2011/0304; B60C 2011/0369; B60C 2011/0395; B60C 11/0304; B60C 11/1323; B60C 11/1369; B60C 2011/0365; B60C 2011/0367; B60C 2011/0372
USPC ............ 152/209.15, 209.18, 209.19, 209.21, 152/209.22, 209.24
See application file for complete search history.

(56) References Cited

U.S. PATENT DOCUMENTS

| | | | |
|---|---|---|---|
| 2013/0112325 A1* | 5/2013 | Mukai ................. | B60C 11/1369 152/209.8 |
| 2014/0230982 A1* | 8/2014 | Ninomiya ........... | B60C 11/0306 152/209.22 |
| 2015/0075686 A1* | 3/2015 | Suga ................... | B60C 11/1392 152/209.16 |
| 2016/0193886 A1* | 7/2016 | Iwasaki ............... | B60C 11/0306 152/209.24 |

FOREIGN PATENT DOCUMENTS

| | | |
|---|---|---|
| JP | 2009-061985 A | 3/2009 |
| JP | 2009-090680 A | 4/2009 |

OTHER PUBLICATIONS

Office Action dated Feb. 27, 2018, issued in counterpart Japanese Application No. 2014-208164, with English translation. (6 pages).

* cited by examiner

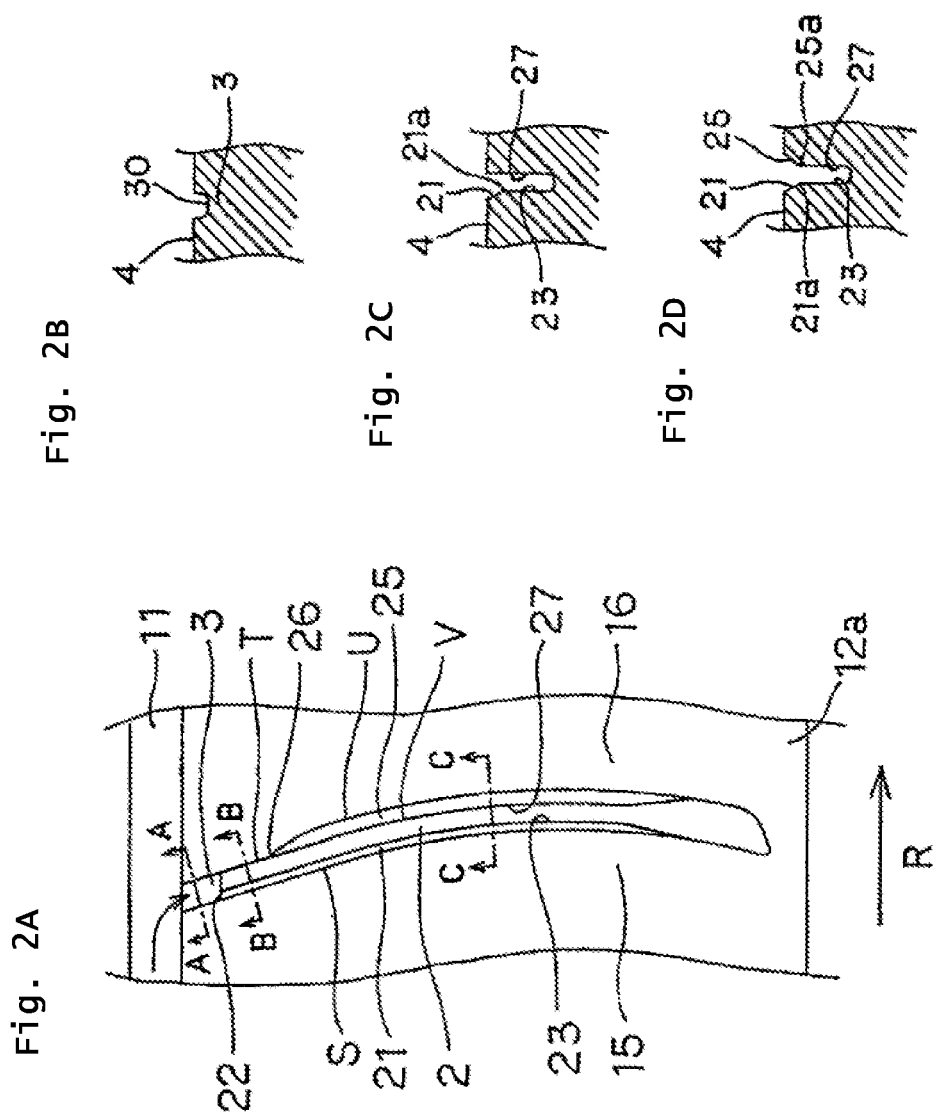

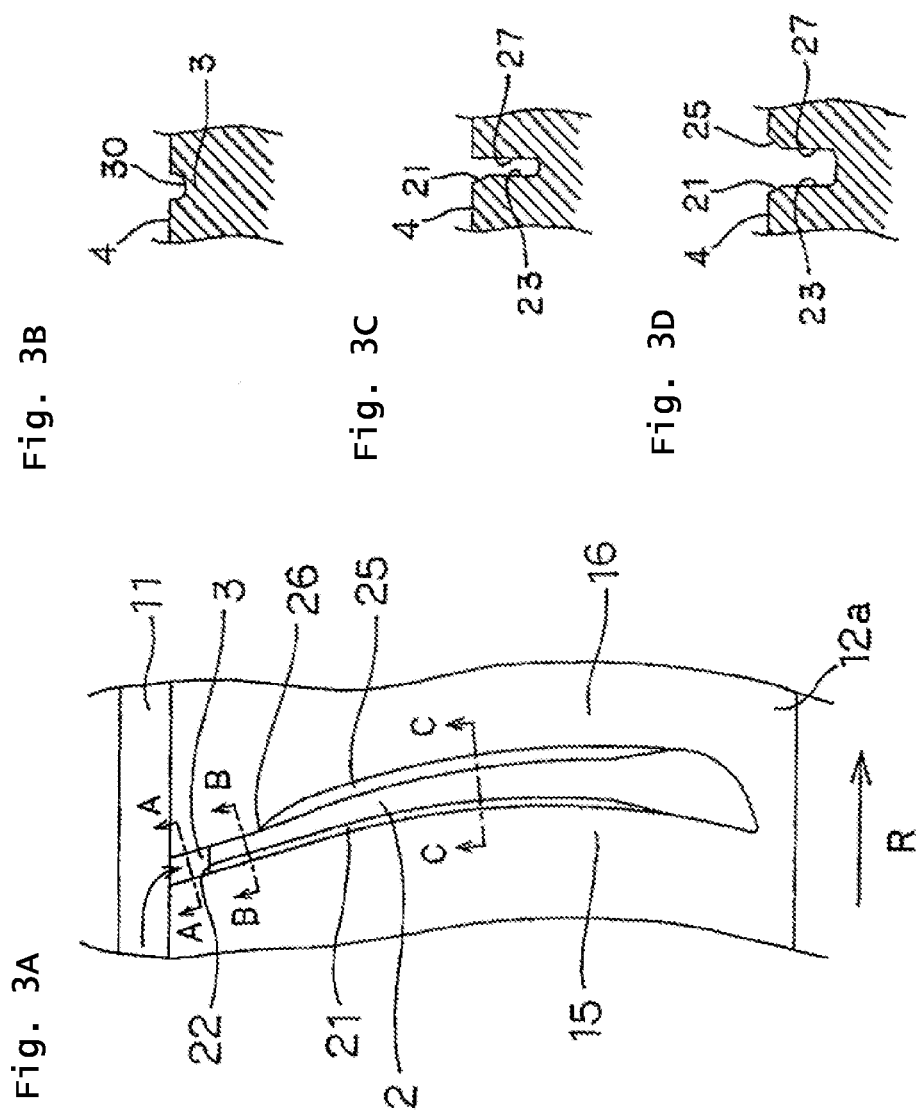

PNEUMATIC TIRE WITH CHAMFERED LATERAL SHOULDER GROOVE

REFERENCE OF RELATED APPLICATION

This application enjoys priority benefit from this application on the basis of Japanese Patent Application No. 2014-208164 (applied Oct. 9, 2014).

BACKGROUND OF THE INVENTION

Field of the Invention

The present invention relates to a pneumatic tire.

Background Art

Generally, a tread of a pneumatic tire includes wide main grooves extending in a tire circumferential direction, and relatively narrow slits extending in a tire width direction. In addition, a plurality of land portions segmented by the main grooves and the slits are formed. The pneumatic tire as described above is subjected to a large contact pressure applied in the vicinity of ends of the land portions on braking, so that the contact pressure is uneven in the land portion. Consequently, a braking distance may be increased or deflective wear may be generated.

In contrast, as described in JP-A-2007-112218 and JP-A-2009-61985, there is a pneumatic tire whereof portions in the vicinity of the ends of the land portions are tapered. The pneumatic tire as described above is subjected to a reduced contact pressure in the vicinity of the ends of the land portions at the time of braking, so that the contact pressure is relatively even in the land portions. Therefore, the braking distance is reduced, and probability of occurrence of deflective wear is reduced.

SUMMARY OF THE INVENTION

However, there is a problem of insufficient drainage performance at slits, which cannot be solved by tapered portions in the vicinity of the ends of the land portions. If the drainage performance is insufficient, the braking distance is increased correspondingly.

Accordingly, it is an object of the invention to provide a pneumatic tire having a good drainage performance and a short braking distance.

A pneumatic tire of the embodiment is a pneumatic tire with a tread having a shoulder portion isolated by a main groove from a portion inside in a tire width direction, and a groove-shaped slit provided on the shoulder portion so as to extend in the tire width direction, wherein a first tapered portion is formed on a side wall of the slit on a land portion side which comes into contact with the ground first when the tire is rotating and a second tapered portion is formed on the side wall of the slit on a land portion side which comes into contact with the ground later, an end of the first tapered portion on a main groove side is located at a position closer to the main groove than the end of the second tapered portion on the main groove side, and the second tapered portion is formed so that a width on an opening end of the slit opening at a contact surface is wider than the width of a portion where the second tapered portion is not formed.

The pneumatic tire of the embodiment has a sufficient drainage performance, and has a shorter braking distance correspondingly.

BRIEF DESCRIPTION OF THE DRAWINGS

FIG. 2A is a drawing illustrating a slit 2 of the pneumatic tire of the embodiment;

FIG. 2B is a cross-sectional view taken along the line A-A in FIG. 2A;

FIG. 2C is a cross-sectional view taken along the line B-B in FIG. 2A;

FIG. 2D is a cross-sectional view taken along the line C-C in FIG. 2A;

FIG. 3A is a drawing illustrating the slit 2 of the pneumatic tire in another form of the embodiment;

FIG. 3B is a cross-sectional view taken along the line A-A in FIG. 3A;

FIG. 3C is a cross-sectional view taken along the line B-B in FIG. 3A; and

FIG. 3D is a cross-sectional view taken along the line C-C in FIG. 3A.

DETAILED DESCRIPTION OF THE INVENTION

Figure 1:
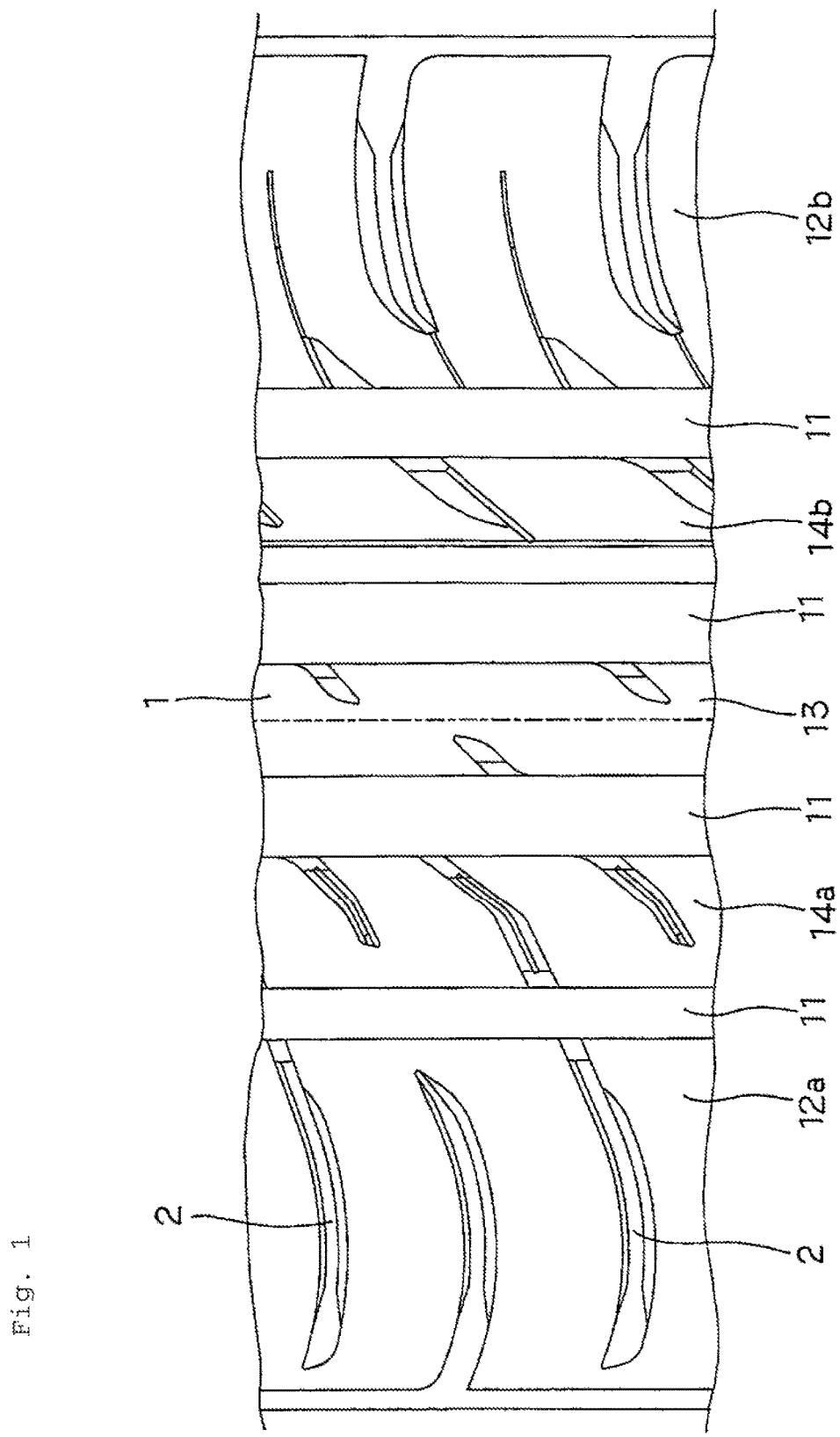
FIG. 1 is a drawing illustrating a tread pattern of a pneumatic tire of an embodiment.

A cross-sectional structure of a pneumatic tire of an embodiment is a known structure. Specifically, a belt layer or the like is provided on a carcass which forms a mainframe of the tire, and a tread 1 is provided thereon. The tread 1 is provided with a tread pattern as illustrated in FIG. 1 on a surface thereof.

In the embodiment in FIG. 1, four main grooves 11 extending in a tire circumferential direction are provided in the tread 1. The tread 1 is also provided with shoulder portions 12a and 12b on both sides in a tire width direction, a center portion 13 at a center in the tire width direction, and mediate portion 14a and 14b between the center portion 13 and the shoulder portions 12a and 12b by being isolated by the main grooves 11.

At least one of the shoulder portions 12a and 12b is provided with groove-shaped slits 2 described later. In this embodiment, the shoulder portion 12a which is on the OUT side (outside in a vehicle width direction) when being mounted on a vehicle is provided with the slits 2. Normally, a plurality of the slits 2 are arranged in the tire circumferential direction. As illustrated, the shoulder portion 12a may be provided with grooves other than the slits 2.

As illustrated in FIGS. 2A to 2D, the slit 2 extends in the tire width direction and opens toward the main groove 11. When viewed from an outside in a tire radial direction, the slit 2 is curved so as to protrude toward a tire rotational direction (indicated by an arrow R in the drawing). The slit 2 is obliquely provided with respect to the tire width direction. Specifically, the slit 2 is inclined in the tire rotational direction with reference to an opening portion toward the main groove 11. In other words, an end of the slit 2 on an outside in the tire width direction is located in the tire rotational direction with respect to the opening portion of the slit 2 opening into the main groove 11.

A portion of a bottom portion of the slit 2 from an opening end of the slit 2 opening into the main groove 11 to a position inward of the slit 2 by a certain distance from the opening end is raised in level and hence a bridge 3 is formed. A land portion 15 which comes into contact with the ground first when the tire is rotating and a land portion 16 which comes into contact with the ground later are provided with the slit 2 positioned therebetween, and the bridge 3 connects these land portions. An upper portion 30 of the bridge 3 is depressed from a contact area 4. The upper portion 30 of the bridge 3 and the deepest portion of the slit 2 may be connected by a bevel, or stepwise.

A first tapered portion 21 is formed on a side wall 23 of the slit 2 on the land portion 15 side which comes into contact with the ground first when the tire is rotating. The first tapered portion 21 has a chamfered shape in the vicinity of the end of the contact area 4 of the land portion 15 which comes into contact with the ground first. The first tapered portion 21 is formed from a position in the tire width direction where the bridge 3 is formed (for example, although it may be a position at an end of the bridge 3 on the main groove 11 side, or may be an intermediate point of a length of the bridge 3 in the tire width direction, a position of an end of the bridge 3 on the outside in the tire width direction in the embodiment illustrated in FIG. 2A to 2D) toward the outside in the tire width direction.

The end of the opening end of the slits 2 on the land portion 15 side opening at the contact area 4 is formed into a curve S from a position where the slit 2 is opened toward the main groove 11 to a position in the vicinity of the end of the slits 2 on the outside in the tire width direction. The first tapered portion 21 is formed at a portion protruded inward of the slits 2 than the curve S.

A height of the first tapered portion 21, that is, a length from an end 21a of the first tapered portion 21 on a bottom portion side of the slit 2 to the contact area 4 in the tire radial direction preferably falls within a range from 10% to 50% of the depth of the slit 2, that is, of the length from the bottom portion of the slit 2 (the bottom portion here means a flat surface it the bottom of the slit 2 is a flat surface, and the deepest portion of the curved surface if the bottom of the slit 2 has a curved surface) to the contact area 4 in the tire radial direction. The height of the end 21a of the first tapered portion 21 on the bottom portion side of the slit 2 from the bottom portion (ditto) of the slit 2 preferably matches the height of the upper portion 30 of the bridge 3 from the bottom portion (ditto) of the slit 2. The upper portion 30 of the bridge 3 is the plane surface if the upper portion 30 is a flat surface, and is the portion depressed most from the contact area 4 of the curved surface if the upper portion 30 is a curved surface.

A second tapered portion 25 is formed on a side wall 27 of the slit 2 on the land portion 16 side which comes into contact with the ground later when the tire is rotating. The second tapered portion 25 has a chamfered shape in the vicinity of the end of the contact area 4 of the land portion 16. An end 26 of the second tapered portion 25 on the main groove 11 side is positioned on the outer side in the tire width direction than an end 22 of the first tapered portion 21 on the main groove 11 side. In the case of this embodiment, the end 26 of the second tapered portion 25 on the main groove 11 side is located on the outer side in the tire width direction than the bridge 3. The second tapered portion 25 is formed from the end 26 on the main groove 11 side toward the outside in the tire width direction.

The second tapered portion 25 is formed so that the width of the opening end of the slit 2 opening at the contact area 4 (the with in this case is the length in a direction orthogonal to a direction in which the slit 2 extends) increases. Therefore, the width of opening end of the slit 2 opening at the contact area 4 within a range in which the second tapered portion 25 is formed is wider than the width of the opening end of the slit 2 opening at the contact area 4 on the main groove 11 side of the second tapered portion 25. A line indicating the end of the opening end on the land portion 16 side of the slit 2 opening at the contact area 4 includes two curves. A first curve is a curve T from a position where the slit 2 opens into the main groove 11 to the end 26 of the second tapered portion 25 on the main groove 11 side. A second curve is a curve U from the end 26 of the second tapered portion 25 on the main groove 11 side to the position in the vicinity of the end of the slit 2 on the outside in the tire width direction. The end 26 of the second tapered portion 25 on the main groove 11 side is a bent point of the two curves T and U.

A portion of the side wall 27 of the slit 2 on the land portion 16 side which comes into contact with the ground later except for the second tapered portion 25 draws a curve V in plan view within a range from the opening end of the slit 2 opening into the main groove 11 to the end of the second tapered portion 25 (as described later, in the case where the width of the second tapered portion 25 is reduced on the outside in the tire width direction, the portion of the second tapered portion 25 the width of which is not reduced) on the outside in the tire width direction of the second tapered portion 25. In other words, a portion of the side walls 27 of the slit 2 on the land portion 16 side except for the second tapered portion 25 is a curved surface in the above-described range.

A height of the second tapered portion 25, that is, a length from an end 25a of the second tapered portion 25 on the bottom portion side of the slit 2 to the contact area 4 in the tire radial direction preferably falls within a range from 10% to 50% of the depth of the slit 2, that is, of the length from the bottom portion of the slit 2 (the bottom portion here means a flat surface if the bottom of the slit 2 is a flat surface, and the deepest portion of the curved surface if the bottom of the slit 2 has a curved surface) to the contact area 4 in the tire radial direction. The height of the end 25a of the second tapered portion 25 on the bottom portion side of the slit 2 from the bottom portion (ditto) of the slit 2 preferably matches the height of the upper portion 30 of the bridge 3 from the bottom portion (ditto) of the slit 2.

Here, the end 21a of the first tapered portion 21 on the bottom portion side of the slit 2 and the end 25a of the second tapered portion 25 on the bottom portion side of the slit 2 are preferably at the same height from the bottom portion (ditto) of the slit 2.

The width (the width in this case is the length in the direction orthogonal to the direction in which the slit 2 expands) of the bottom portion of the slit 2 (the bottom portion here means a flat surface when the bottom of the slit 2 is flat surface, and is a curved surface when the bottom of the slit 2 is a curved surface) is constant within a range in which both of the first tapered portion 21 and the second tapered portion 25 are formed.

Generally, the depth of the slit 2 is smaller as it goes outside in the tire width direction. In conjunction with it, as illustrated in the drawing, there is the case where the first tapered portion 21 and the second tapered portion 25 are not formed on a portion of the slits 2 on the outside in the tire width direction. In the portion of the slit 2 on the outside in the tire width direction, there is a case where the widths (the width here is a length in the direction orthogonal to the direction in which the slit 2 extends) of the first tapered portion 21 and the second tapered portion 25 are narrowed. The length of these portions in the tire width direction preferably falls within 30% of the entire length of the slit 2 in the tire width direction.

Advantageous effects of the pneumatic tire having the structure as described above will be described.

As described above, the first tapered portion 21 and the second tapered portion 25 are formed on two of the side walls 23 and 27 of the slits 2, and a plurality of the slits 2 are arranged in the tire circumferential direction. Therefore, the land portion interposed between the two slits 2 and 2 is provided with tapered portions at both ends on a stepping-on side and a kicking side. Therefore, a contact pressure applied to the portion in the vicinity of the ends of the land portions is reduced, so that the contact pressure is relatively even in the land portion. Therefore, the braking distance of the tire is reduced, and probability of occurrence of deflective wearing of the tread 1 is reduced.

Water flowing along the main groove 11 hits against the side wall 27 on the side of the land portion 16 which comes into contact with the ground later when the tire is rotating (that is, the land portion located in the tire rotational direction with respect to the slit 2) at a portion in the vicinity of the opening end of the slit 2 opening into the main groove 11, and enters the slit 2. A flow channel of the water is as indicated by an arrow in FIG. 2A. The water that has entered the slits 2 passes in the slit 2 and is discharged to the outside in the tire width direction.

In this embodiment, the end 26 of the second tapered portion 25 on the main groove 11 side is apart from the main groove 11 in comparison with the end 22 of the first tapered portion 21 on the main groove 11 side. In other words, on the side wall 27 on the land portion 16 side which comes into contact with the ground later when the tire is rotating, the second tapered portion 25 is not formed over a relatively long distance from the opening end of the slit 2 opening into the main groove 11. Therefore, the water that has hit against the side wall 27 on the side of the land portion 16 which comes into contact with the ground later when the tire is rotating is reliably directed in the direction in which the slits 2 extends. Therefore, the water that has entered the slits 2 is reliably discharged. Accordingly, the braking distance of the tire is short.

In addition, since the second tapered portion 25 is formed so that the width of the opening end of the slit 2 opening at the contact area 4 is increased, the flow channel of water in the slit 2 is wider correspondingly. Therefore, the sufficient drainage performance from the slit 2 is achieved, and the braking distance of the tire is short.

The bridge 3 is formed in the vicinity of the end in the slits 2 on the main groove 11 side, and the bridge 3 connects the land portion 15 which comes into contact with the ground first when the tire is rotating and the land portion 16 which comes into contact with the ground later, and hence the rigidity of the land portions 15 and 16 is high. Therefore, the contact pressure at the land portions 15 and 16 may be maintained evenly, and the braking distance of the tire is reduced correspondingly. The probability of occurrence of deflective wearing of the tread 1 is also reduced.

The end 22 of the first tapered portion 21 on the main groove 11 side is at a position of the bridge 3 close to the main groove 11. Therefore, the slit 2 is provided with the first tapered portion 21 formed over a wide range in the tire width direction. Therefore, a contact pressure applied to the portion in the vicinity of the ends of the land portions is reduced, so that the contact pressure is relatively even in the land portions. Consequently, the braking distance is reduced, and probability of occurrence of deflective wearing is reduced.

If the height of the first tapered portion 21 and the second tapered portion 25 is not smaller than 10% of the depth of the slits 2, sufficient drainage performance of the slits 2 is ensured. If the height of the first tapered portion 21 and the second tapered portion 25 is not larger than 50% of the depth of the slits 2, the rigidity of the land portion is not lowered extremely. Therefore, if the height of the first tapered portion 21 and the second tapered portion 25 falls within a range from 10% to 50% of the depth of the slits 2, the braking distance is specifically short.

The braking distance and a deflective wearing resistance performance of the pneumatic time of an example and a comparative example were examined.

The pneumatic tire of the example has the characteristics of the embodiment. In contrast, in the pneumatic tire of the comparative example, tapered portions are formed on the side walls on both sides of the slit (the land portion side that comes into contact with the ground first when the tire is rotating and the land portion side that comes into contact with the ground later). However, these tapered portions are formed from the opening end of the slit opening into the main groove to the outside in the tire width direction. The bridge is not formed on the pneumatic tire of the comparative example.

The braking distance was examined in the following manner. The pneumatic tire was set to have a vehicle-specified air pressure, was assembled to a standard rim, and was mounted on the vehicle. The vehicle was traveled on a road surface provided with a water film having a thickness of 1 mm at a speed of 100 km/h, and was fully braked, and the distance until the vehicle comes to a complete stop was measured. An inverse of the distance until the vehicle comes to a complete stop was obtained and the inverse thereof is converted into an index, the value of a comparative example 1 being 100. The larger the index, the shorter braking distance becomes.

The deflective wearing resistance performance was examined in the following manner. The pneumatic tire was mounted on the vehicle in the same manner as described above, and the vehicle was traveled by 12000 km. A heel and tow abrasion was examined, and an inverse thereof was obtained. The inverse was converted into an index, the value of the comparative example 1 being 100. The larger the index, the less the heel and tow abrasion becomes and the better the deflective wearing resistance performance becomes.

The size of the pneumatic tire used here was 225/50R17.

The result was as shown in Table 1. The indexes of the braking distance and the deflective wearing resistance performance were larger in the example. From this result, it was found that the pneumatic tire of the example had a shorter braking distance and had a better deflective wearing resistance performance than the pneumatic tire of the comparative example.

TABLE 1

|  | Comparative Example | Example |
| --- | --- | --- |
| Braking Distance (Index) | 100 | 105 |
| Deflective Wearing Resistance Performance (Index) | 100 | 105 |

A modification will be described below.

The number of the main grooves is not limited to four. There is the case where the mediate portion or the center portion does not exist depending on the number of the main grooves, and the case where the number of these portions is different from those in the embodiment illustrated in FIG. 1.

The slit does not have to be curved and, for example, may be a linear shape. The slit does not have to be obliquely provided with respect to the tire width direction.

The bridge is preferably provided on the slit, but does not have to be provided necessarily.

As illustrated in FIGS. 3A to 3D, in a range in which both of the first tapered portion 21 and the second tapered portion 25 of the slit 2 are formed, the width of the bottom portion of the slit 2 may increase as it moves away from the main groove 11. In this configuration, water in the slit 2 may be discharged easily to the outside in the tire width direction, and the braking distance of the tire is further reduced.

In this case, the width of the bottom portion of the slit 2 in the end on the outside in the tire width direction within the range in which both of the first tapered portion 21 and the second tapered portion 25 are formed preferably falls within a range from 110% to 150% of the width of the bottom portion of the slit 2 at the end in the range on the main groove 11 side. If it is 110% or higher, the drainage performance of the slit 2 is specifically good. If it is not higher than 150%, the rigidity of the land portion is not lowered in the extreme. Therefore, the braking distance is specifically short if it falls within the range from 110% to 150%.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A pneumatic tire with a tread having a shoulder portion isolated from a portion on the inside in a tire width direction by a main groove, and a groove-shaped slit formed on the shoulder portion so as to extend in the tire width direction, wherein
   a first tapered portion is formed on a side wall of the slit on a land portion side which comes into contact with the ground first when the tire is rotating, and a second tapered portion is formed on the side wall of the slit on a land portion side which comes into contact with the ground later,
   an end of the first tapered portion on the main groove side is located at a position closer to the main groove than an end of the second tapered portion on the main groove side, and
   the second tapered portion is formed so that a width on an opening end of the slit opening at a contact surface is wider than the width of the portion where the second tapered portion is not formed,
   a portion of the bottom portion of the slit from the end of the slit on the main groove side to a position inward of the slit from the end by a certain distance is raised and a bridge is formed,
   the end of the first taper portion on the main groove side is located at a position of the bridge in the tire width direction and terminates at the outer end of the bridge in the tire width direction, and
   the end of the second taper portion on the main groove side is located on an outer side in the tire width direction than the bridge.

2. The pneumatic tire according to claim 1, wherein a width of a bottom portion of the slit increases as it goes away from the main groove.

3. The pneumatic tire according to claim 1, wherein heights of ends of the first tapered portion and the second tapered portion from the bottom portion of the slit on the slit bottom portion side matches a height of the bridge from the bottom portion of the slit.

4. The pneumatic tire according to claim 2, wherein heights of ends of the first tapered portion and the second tapered portion from the bottom portion of the slit on the slit bottom portion side matches a height of the bridge from the bottom portion of the slit.

5. A pneumatic tire with a tread mounted on a vehicle, the pneumatic tire having a shoulder portion isolated from a portion on the inside in a tire width direction by a main groove, and a groove-shaped slit formed on the shoulder portion so as to extend in the tire width direction, wherein
   a first tapered portion is formed on a side wall of the slit on a land portion side which comes into contact with the ground first when the tire is rotating, and a second tapered portion is formed on the side wall of the slit on a land portion side which comes into contact with the ground later,
   an end of the first tapered portion on the main groove side is located at a position closer to the main groove than an end of the second tapered portion on the main groove side, and
   the second tapered portion is formed so that a width on an opening end of the slit opening at a contact surface is wider than the width of the portion where the second tapered portion is not formed,
   wherein the tread has an in side in a tire width direction mounted on an inside in a vehicle width direction and an out side in a tire width direction mounted on an outside in a vehicle width direction,
   wherein the shoulder portion is on the out side of the tread,
   a portion of the bottom portion of the slit from the end of the slit on the main groove side to a position inward of the slit from the end by a certain distance is raised and a bridge is formed,
   the end of the first taper portion on the main groove side is located at a position of the bridge in the tire width direction, and
   the end of the second taper portion on the main groove side is located on an outer side in the tire width direction than the bridge.

6. A pneumatic tire with a tread having a shoulder portion isolated from a portion on the inside in a tire width direction by a main groove, and a groove-shaped slit formed on the shoulder portion so as to extend in the tire width direction, wherein
   a first tapered portion is formed on a side wall of the slit on a land portion side which comes into contact with the ground first when the tire is rotating, and a second tapered portion is formed on the side wall of the slit on a land portion side which comes into contact with the ground later,
   an end of the first tapered portion on the main groove side is located at a position closer to the main groove than an end of the second tapered portion on the main groove side, and
   the second tapered portion is formed so that a width on an opening end of the slit opening at a contact surface is wider than the width of the portion where the second tapered portion is not formed,
   a portion of the bottom portion of the slit from the end of the slit on the main groove side to a position inward of the slit from the end by a certain distance is raised and a bridge is formed, the end of the first taper portion on the main groove side is located at a position of the bridge in the tire width direction, the end of the second taper portion on the main groove side is located on an outer side in the tire width direction than the bridge, and the groove-shaped slit has an end opposite the main groove side that terminates prior to an edge of the tread.

* * * * *